(12) United States Patent
Payne

(10) Patent No.: US 9,490,967 B1
(45) Date of Patent: Nov. 8, 2016

(54) COMMUNICATION SYSTEM AND METHOD

(71) Applicant: Texas Instruments Incorporated, Dallas, TX (US)

(72) Inventor: Robert Floyd Payne, Lucas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/978,363

(22) Filed: Dec. 22, 2015

(51) Int. Cl.
*H04L 5/20* (2006.01)
*H04L 7/027* (2006.01)
*H04L 25/02* (2006.01)
*H04L 1/00* (2006.01)
*H04L 7/00* (2006.01)
*H04L 25/14* (2006.01)

(52) U.S. Cl.
CPC ............ *H04L 7/027* (2013.01); *H04L 1/0045* (2013.01); *H04L 5/20* (2013.01); *H04L 7/0079* (2013.01); *H04L 7/0091* (2013.01); *H04L 25/026* (2013.01); *H04L 25/0272* (2013.01); *H04L 25/14* (2013.01)

(58) Field of Classification Search
CPC ..... H04L 5/20; H04L 7/0079; H04L 7/0091; H04L 25/026; H04L 25/0272; H04L 25/14; H04L 25/0292; H04B 3/00

USPC ....... 375/316, 220, 244, 245, 286, 257, 287, 375/288, 289
See application file for complete search history.

(56) References Cited

U.S. PATENT DOCUMENTS

2008/0315920 A1* 12/2008 Hung ................... H03K 5/2481
326/105

* cited by examiner

*Primary Examiner* — Siu Lee
(74) *Attorney, Agent, or Firm* — John R. Pessetto; Charles A. Brill; Frank D. Cimino

(57) ABSTRACT

A communication system includes a receiver for decoding data having three states of −1, 0, and 1. The receiver includes a first input coupled to a first data line, a second input coupled to a second data line, and a third input coupled to a third data line. A first comparator is coupled to a first output, wherein the first comparator is for generating data signals in response to the sign of voltages on the first data line minus voltages on the second data line. A second comparator is coupled to a second output, wherein the second comparator is for generating clock signals in response to the sign of voltages on the third data line minus the average of voltages on the first and second data lines.

20 Claims, 6 Drawing Sheets

| A | B | C | A-B | C-(A+B)/2 | DATA | CLOCK |
|---|---|---|---|---|---|---|
| 0 | +1 | -1 | -1 | -1.5 | 0 | 0 |
| 0 | -1 | +1 | 1 | 1.5 | 1 | 1 |
| +1 | 0 | -1 | 1 | -1.5 | 1 | 0 |
| -1 | 0 | +1 | -1 | 1.5 | 0 | 1 |
| +1 | -1 | 0 | 2 | 0 | X | X |
| -1 | +1 | 0 | -2 | 0 | X | X | ns of US 9,490,967 B1

COMMUNICATION SYSTEM AND METHOD

BACKGROUND

Processors, such as digital and mixed-signal processors require digital data communications between various processing, storage, and interface (input/output) subsystems in the processors. As the required data communication rates increase, such as to the terabit/second range, the complexity, area, and power of interface circuits between these subsystems also increases.

At a high level, two techniques are generally used for data communications. The first technique uses many parallel data lines in addition to a clock. The second technique uses serializer/deserializer (SerDes) technology. The parallel data communication technique includes a plurality of buffers for boosting the data signals. The buffers draw large dynamic currents from a power supply, which cause power supply noise due to finite impedance of the power delivery network. Therefore, the parallel communications techniques are not desirable for many high speed communications.

SerDes techniques are very complex and result in significant design effort, consumption of die area, and power. Additionally, the SerDes techniques potentially add many points of failure to the processors in which they are located. The SerDes systems are therefore typically used at the boundaries of circuits for off-die interconnects and are typically not compatible with communications in a die constituting a processor.

SUMMARY

A communication system includes a receiver for decoding data, wherein the data has three states of −1, 0, and +1. The receiver includes a first input coupled to a first data line, a second input coupled to a second data line, and a third input coupled to a third data line. A first comparator is coupled to a first output, wherein the first comparator is for generating data signals in response to the sign of voltages on the first data line minus voltages on the second data line. A second comparator is coupled to a second output, wherein the second comparator is for generating clock signals in response to the sign of voltages on the third data line minus the average of voltages on the first and second data lines.

DETAILED DESCRIPTION

Processors, such as digital and mixed-signal processors, use high speed data communications to transfer data between various processing, storage, and interface (input/output) subsystems in the processors. Two techniques are generally used for data communications. The first technique uses many parallel data lines in addition to a clock signal operating on a separate data line. A second technique uses serializer/deserializer (SerDes) technology.

Figure 1:
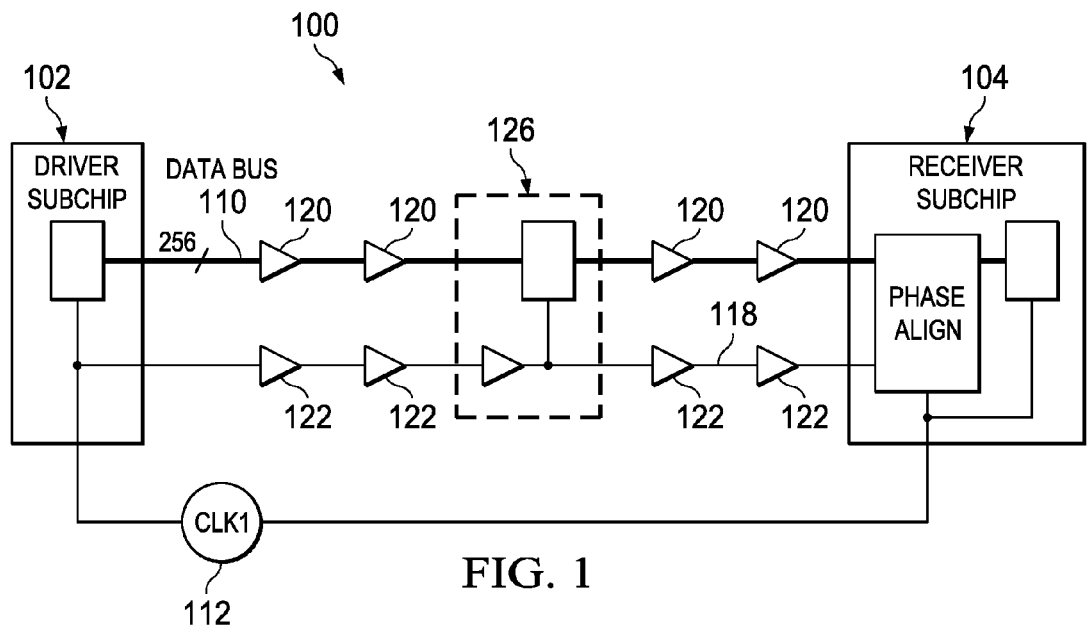
FIG. 1 is a block diagram of a parallel data communication system.

FIG. 1 is a block diagram of a parallel data communication system 100. The system 100 includes a driver subchip 102 and a receiver subchip 104 as may be implemented in a system on chip (SOC) or multi-core processor. Many of the communication techniques described with reference to FIG. 1 additionally apply to systems where data travels off the die between two chips on an integrated system in package (SIP) or between two packaged chips communicating on a system board.

A data bus 110 transmits data between the driver subchip 102 and the receiver subchip 104. In the example of FIG. 1, the data bus 110 is 256 bits wide, meaning that it contains 256 parallel wires or other conductors. A global clock 112 distributes a clock signal to both the driver subchip 102 and the receiver subchip 104. The clock signal is used to "clock out" data and provides a clock signal on a clock line 118 coupled between the driver subchip 102 and the receiver subchip 104.

When the routing distance between the driver subchip 102 and the receiver subchip 104 is large and the data rates on the data bus 110 are high, the parasitic resistance and capacitance on the interconnects between the driver subchip 102 and the receiver subchip 104 limit the bandwidth and maximum data rates. In some examples, when the routing distances are 1.0 mm to 1.5 mm and the data rates are 500 Mb/s to 1500 Mb/s, the parasitic resistance and capacitance on the interconnects between the driver subchip 102 and the receiver subchip 104 limit the bandwidth and maximum data rate on the data bus 110.

In order to improve the data rates, buffers 120 are inserted into the data bus 110 between the driver subchip 102 and the receiver subchip 104 to re-drive the data on the data bus 110. Buffers 122 also re-drive the clock signal on the clock line 118 between the driver subchip 102 and the receiver subchip 104. In some examples, the data bus 110 is re-timed as indicated by the circled block 126. In some systems, there may be millions of buffers 120, 122 on a single die or chip. This high number of buffers 120, 122, along with the large width of the data bus 110 consumes significant die area. The buffers 120, 122 also consume significant power, reaching over 5 W on some systems. The buffers 120, 122 are typically fabricated with CMOS inverters that have an output voltage swing between 0V and the power supply voltage for the system 100, which is typically 0.8V to 1.2V. Accordingly, the buffers 120, 122 draw large dynamic currents from the power supply, which results in supply noise due to the finite impedance of the power delivery network. Therefore, the use of the buffers 120, 122 is not desirable for high speed data busses.

Figure 2:
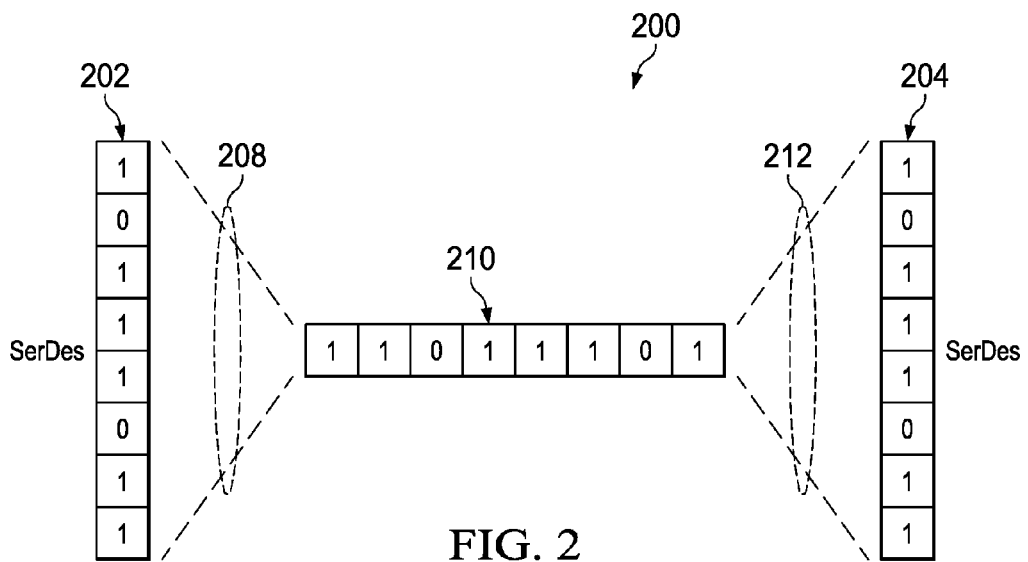
FIG. 2 is a block diagram of a communication system using serializer/deserializer (SerDes) technology.

FIG. 2 is a block diagram of a communication system 200 using serializer/deserializer (SerDes) technology. The system 200 increases data rates by combining multiple streams of lower speed parallel data into single higher speed serial data streams. The system 200 includes a driver subchip 202 and a receiver subchip 204 that output and input parallel data, respectively. In the example of FIG. 2, the parallel data has eight bits or channels. The parallel data received by the driver subchip 202 is serialized into serial data by a serializer 208. The serial data is transmitted to the receiver subchip 204 by a high speed serial data line 210. The serial data line 210 has to operate at the number of parallel channels faster than the data rate of the parallel channel. The serial data is deserialized to parallel data by a deserializer 212 for processing by the receiver subchip 204.

Some examples of SerDes systems include clock generation and recovery circuits, data line drivers, test circuits, receivers, and other devices. These SerDes systems are very complex compared to the parallel communication systems. The complexity of SerDes systems results in significant design effort, consumption of die area and power, and potentially adds many points of failure in the system 200. These systems are therefore typically used at the boundaries of chips for off-die interconnects and are rarely used in on-die communication.

The circuits and methods described herein overcome the issues with parallel and SerDes communications systems. The circuits and methods eliminate the SerDes functions and embed the clock signals in the data stream using three wires or conductors and three signaling logic levels −1, 0, and +1. The three signaling levels are voltages, such as −5V, 0V, and +5V or other voltages as described herein. The clock signal and one bit of data are transmitted simultaneously.

The three signaling logic levels of −1, 0, +1 on three wires enables a possibility of 27 ($3^3$) different signal combinations. In many examples, the combinations that are not "differential-like", meaning those combinations where the sum of the data values on each data line are equal to zero, are eliminated. When the sum of the data values is equal to zero, external interactions due to electromagnetic interference (EMI) are minimized. This minimization of EMI maintains many of the desirable characteristics of differential signaling, such as preventing errors during the communications. Fewer, if any, buffers are required for such data transmissions. There are six combinations remaining when the sums that do not add to zero are eliminated.

Figures 3, 4:
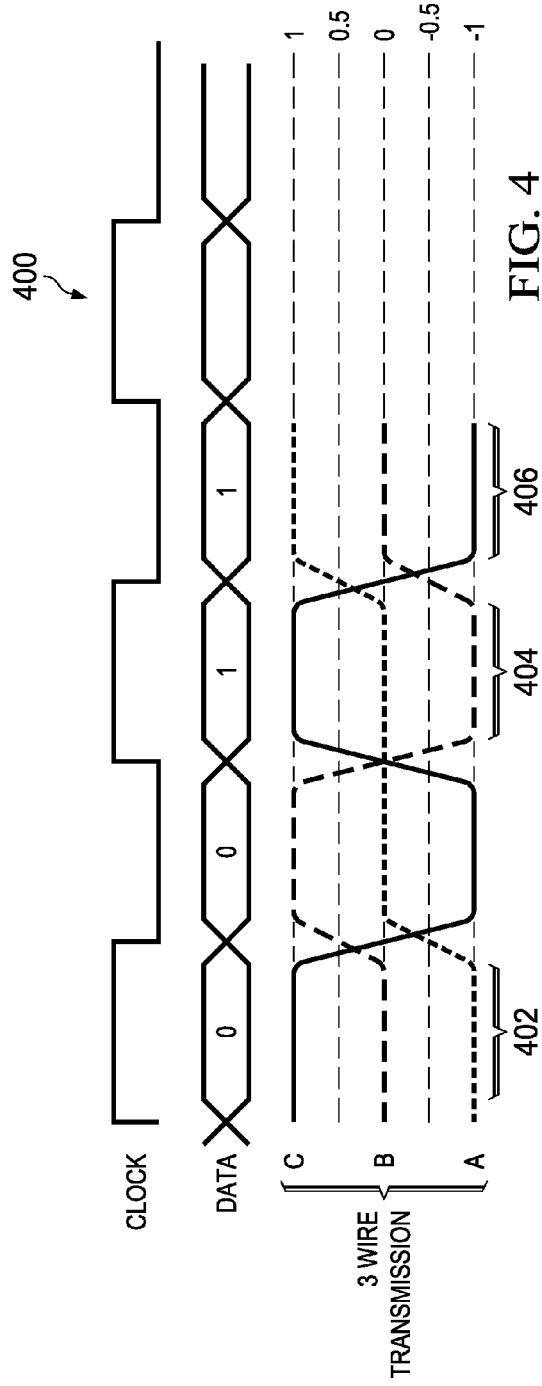
FIG. 3 is a chart showing six combinations or codes for a three wire communication system having three signal levels per wire.
FIG. 4 is a timing diagram showing signals on the three wires and the resulting data and clock signals.

FIG. 3 is a chart 300 showing the six combinations for the three signal levels transmitted on a three wire system. The three wires are designated as wire A, wire B, and wire C. As shown in the chart 300, the sum of the data values on the wires for each combination is zero. For example, in the first combination, the A data value (data value on wire A) is 0, the B data value is +1, and the C data value is −1, which adds to 0. The data combinations described herein are further limited to the combinations 302, which are the first four combinations in the chart 300. The remaining combinations have values beyond −1 and +1 and are therefore undefined.

The communication systems described herein transmit data and a clock signal simultaneously on three wires. The receiver for the communication system compares the data values on the three wires A, B, and C to extract the data signal and the clock signal. The clock signal is derived as sign(C−(A+B)/2). In the examples provided herein, when sign(C−(A+B)/2) is positive, the clock signal is a logic 1 and when sign(C−(A+B)/2) is negative, the clock signal is a logic 0. The data signal is derived from sign(A−B). In the examples provided herein, when sign(A−B) is positive, the data value is logic 1 and when sign(A−B) is negative, the data value is logic 0.

The use of the data values of −1, 0, and +1 provides that the difference between the data values on the A wire and B wire will always have a magnitude of 1. Furthermore, the magnitude of the data values corresponding to the clock signal of (C−(A+B)/2) will always be 1.5. The magnitudes of the above-described signals are equivalent to their signal strength and therefore they are immune to noise. For example, for a valid logic 1 data signal, the value of A minus B is equal to 1 and for a valid logic 0 signal, the value of A−B is equal to −1. For a valid clock logic 1 signal, the value of (C−(A+B)/2) is equal to 1.5 and for a valid logic 0 signal, the value of (C−(A+B)/2) is equal to −1.5. In this case, it is seen that there is more signal magnitude available for the clock signal than there is for the data signal.

FIG. 4 is a timing diagram 400 showing exemplary signals on the three wires and the resulting data and clock signals. The signals in FIG. 4 are the logic levels or −1, 0, and +1. As shown in FIG. 4, the data value is the sign of the signal on wire A minus the signal on wire B. At a period 402, the signal on wire A is −1 and the signal on wire B is 0, so the resulting data value is logic 0. At a period 404, the signal on wire A is 0 and the signal on wire B is −1, so the resulting data value is logic 1. The value of the clock signal is determined by the sign of the signal on wire C minus the average of the sum of the signals on wires A and B. Accordingly, the clock signal at period 402 is logic 1 and the clock signal at a period 406 is logic 0.

Figure 5:
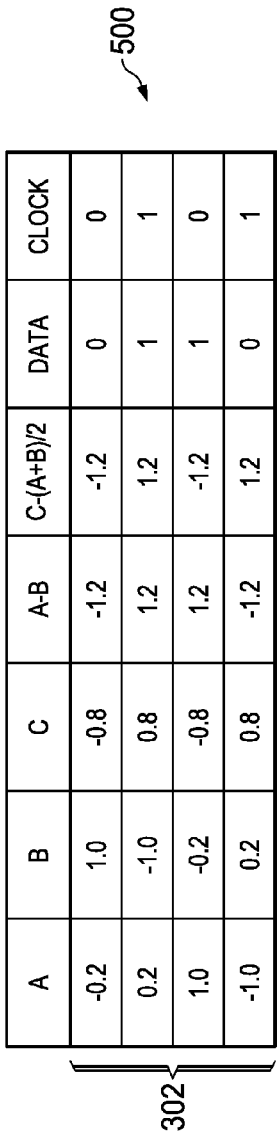
FIG. 5 is a chart showing an example of normalized voltages that cause the combinations of FIG. 3 to add to zero.

In order to improve the signal strengths of the data signal relative to the clock signal and maintain the condition that the sum of the signals on the wires A, B, and C is equal to zero, different normalized voltages may be transmitted as the voltage values. FIG. 5 is a chart 500 showing an example of normalized voltages that cause the sums of the combinations 302 to equal zero and equalize the magnitude of the data and clock signals. As shown by the chart 500, the normalized voltages on wire C are either +0.8V or −0.8V. The normalized voltages on wires A and B are either +0.2V, −0.2, +1.0V, or −1.0V. As shown in the chart 500, when the normalized voltage on either wire A or B is +1.0, the voltage on the other wire is −0.2V. Likewise, when the voltage on either wire A or B is −1.0V, the voltage on the other wire is +0.2V. Accordingly, the voltage on wire C is either +0.8V or −0.8V, so that the sum of the normalized voltages on the wires A, B, and C is equal to zero, which is referred to as balanced signaling. In addition to balanced signaling, the magnitudes of A−B and C−(A+B)/2 are equal to 1.2, which adds a 1.6 dB (20*log(1.2/1)) improvement in the system signal to noise ratio (SNR).

Figure 6:
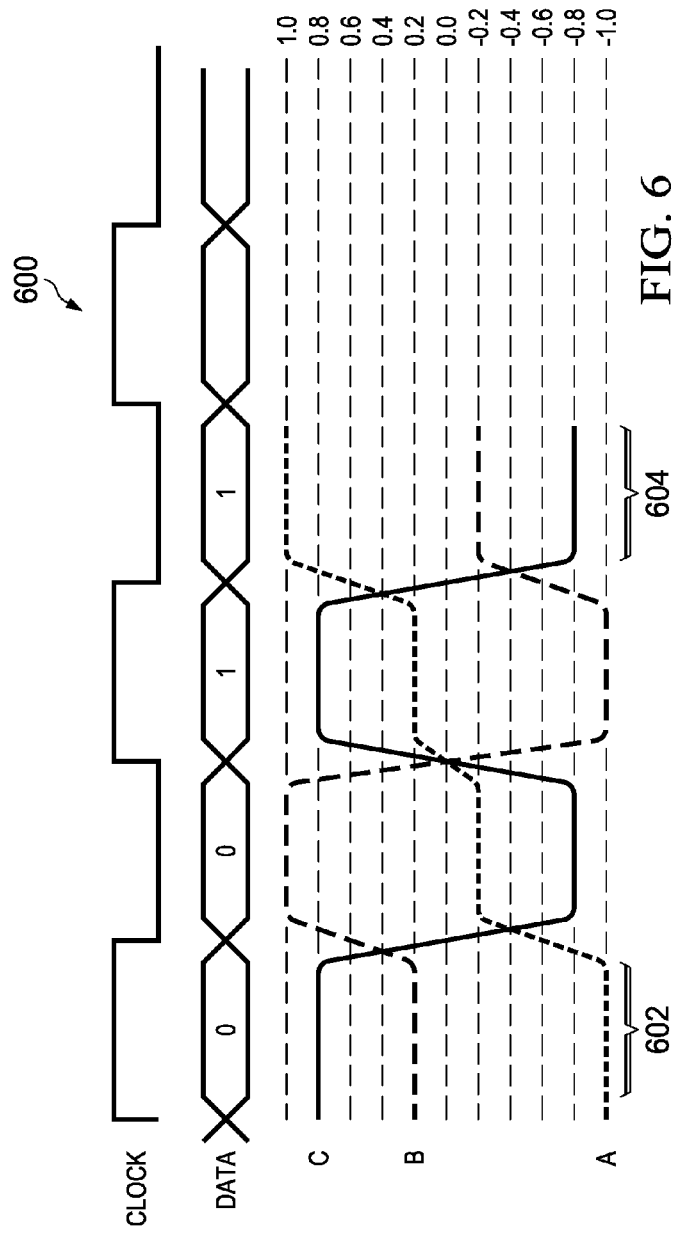
FIG. 6 is a timing diagram showing normalized voltages on the three wires and the resulting data and clock signals.

FIG. 6 is timing diagram 600 showing normalized voltages on the three wires and the resulting data and clock signals. During a period 602, the voltage on wire A is −1.0V, the voltage on wire B is +0.2V, and the voltage on wire C is +0.8V. The sign of A minus B is negative, so the data value is logic 0. The sign of C−(A+B)/2 is positive, so the clock signal is logic 1. During a period 604, the voltage on wire A is 1.0V, the voltage on wire B is −0.2V, and the voltage on wire C is −0.8V. The sign of A minus B is positive, so the data value is logic 1. The sign of C−(A+B)/2 is negative, so the clock signal is logic 0.

Figure 7:
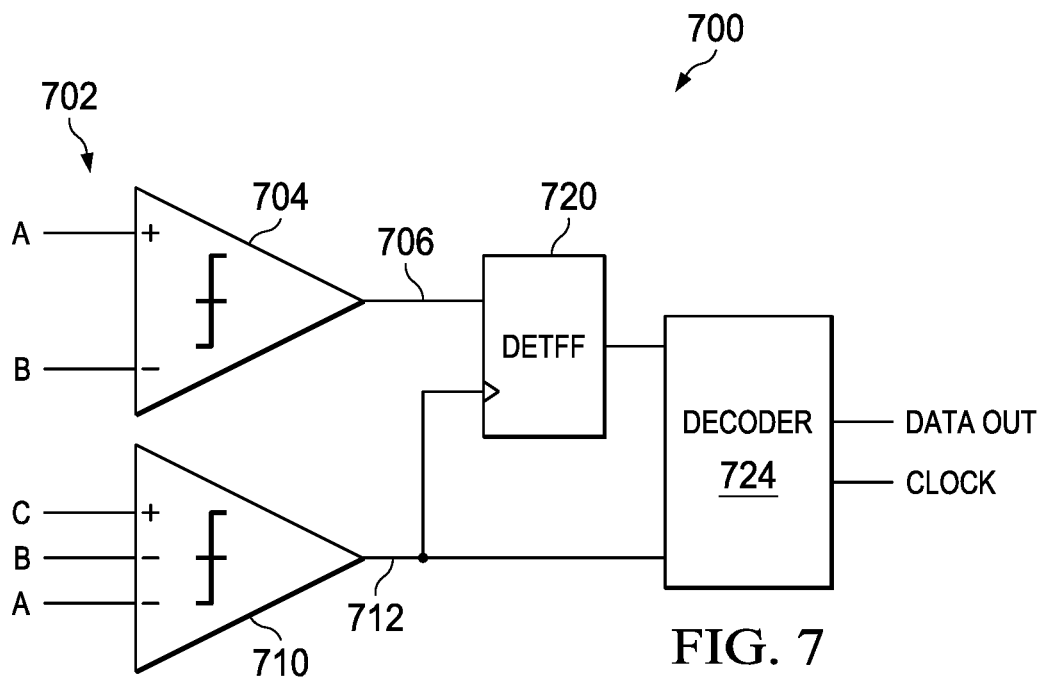
FIG. 7 is a block diagram of an example receiver that decodes the voltages on a three-wire transmission system to data signals and clock signals.

FIG. 7 is a block diagram of an example receiver 700 that decodes the voltages on the wires A, B, and C to data and clock signals. The receiver 700 includes inputs 702 that couple to the three wires A, B, and C. A first comparator 704 has a non-inverting input coupled to wire A and an inverting input coupled to wire B. The signal at the output 706 is a logic level corresponding to the sign of the voltage on wire A minus the voltage on wire B. When the sign of the voltage on the output 706 is positive, the receiver 700 outputs a logic 1 as the data signal. When the sign of the voltage on the output 706 is negative, the receiver 700 outputs a logic 0 as the data signal.

A second comparator 710 compares the voltage on wire C to the common mode of the voltages on wires A and B, which is (A+B)/2. When the voltage on the output 712 of the second comparator 710 is positive, the clock signal is logic 1. When the voltage on the output 712 of the second comparator 710 is negative, the clock signal is logic 0. In the example receiver 700 of FIG. 7, the clock signal is transmitted to a double edge triggered flip-flop (DETFF) 720 and a decoder 724. The decoder 724 may serve as a latch to output the data signals and clock signals at a specific time as timed to the clock signals. Both the first comparator 704 and the second comparator 710 are decoders that decode the voltages on the wires A, B, and C to their appropriate logic levels. In other examples, decoders other than comparators may be substituted for the comparators 704 and 710.

Figure 8:
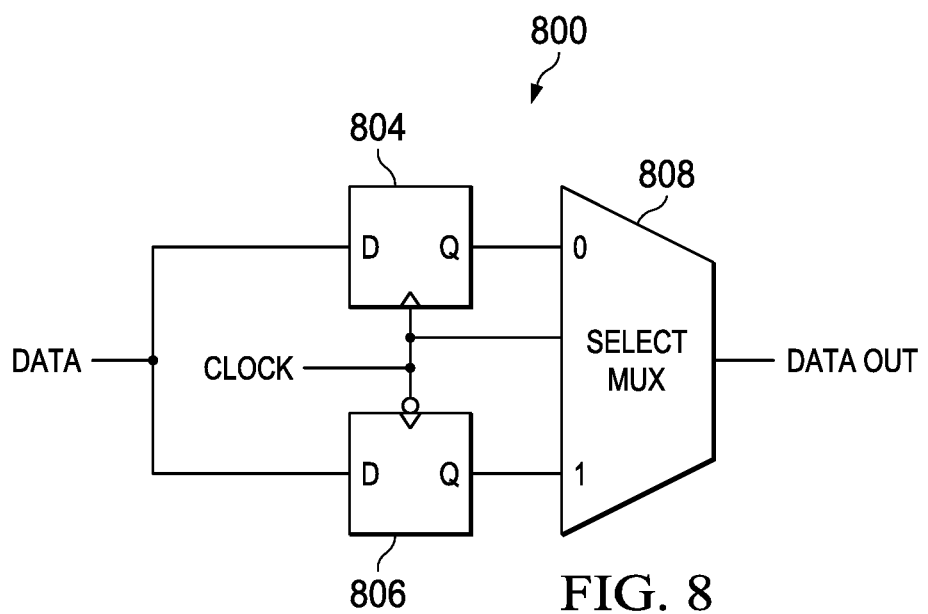
FIG. 8 is a block diagram of a double edge triggered flip-flop (DETFF) that is representative of one of the DETFFs of FIG. 7.

FIG. 8 is a block diagram of a DETFF 800 that is representative of the DETFF 720 from FIG. 7. The DETFF 800 uses the clock signal operating at a frequency f to register the data operating at a frequency 2f. For example, the data could operate or transfer at a rate of 2.0 Gbps and the clock may operate at 1.0 GHz. The DETFF 800 includes a first D/Q flip-flop 804, a second D/Q flip-flop 806, and a multiplexor 808. The clock signal is coupled to the selection of the flip-flops 804 and 806, wherein the clock signal is inverted into the second flip-flop 806. The clock signal is also the selection input for the multiplexor 808. When the clock signal transitions high, the data at the first flip-flop 804 is passed to the output designated DATA OUT. When the clock signal transitions low, the data at the second flip-flop 806 is passed to the output designated DATA OUT. Accordingly, the data is passed on every clock signal transition.

Figure 9:
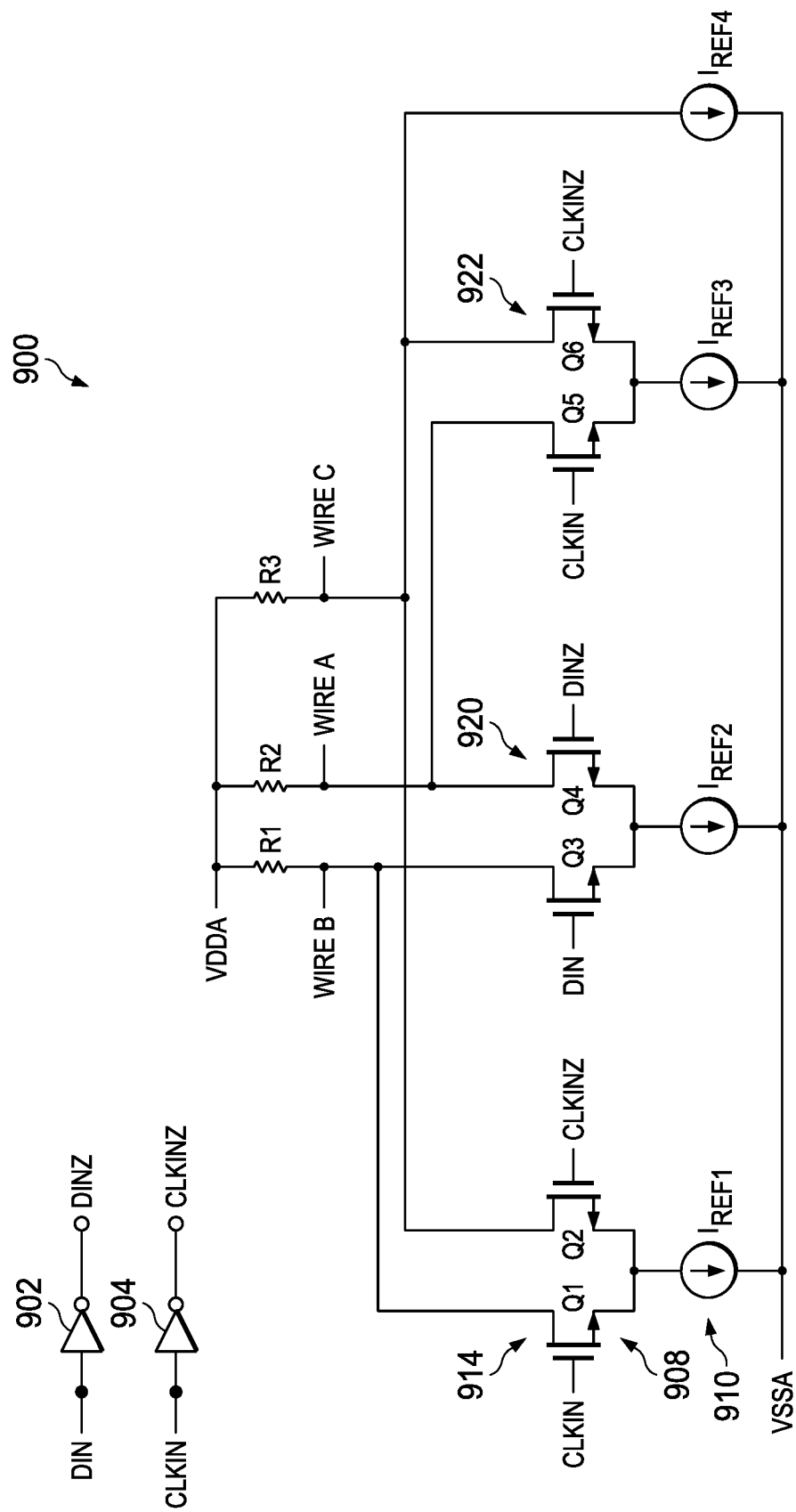
FIG. 9 is a detailed schematic diagram of an example transmitter for generating signal levels on three wires.

FIG. 9 is a detailed schematic diagram of an example transmitter 900 for generating signal levels on three wires. Specifically, the transmitter 900 receives inputs DIN (input data) and CLKIN and generates three outputs for wires A through C. The transmitter 900 includes inverters 902 and 904 that invert the signals DIN and CLKIN to DINZ and CLKINZ.

The transmitter 900 includes a plurality of differential pairs 908, each consisting of a pair of transistors, which in the example of FIG. 9 are field-effect transistors (FETs). Each of the differential pairs 908 is coupled to a current source 910 that drives a current to a source VSSA. In the example of FIG. 9, the currents $I_{REF1}$ to $I_{REF4}$ are normalized as described below. The transmitter 900 includes three resistors R1, R2 and R3 that are coupled between a power source VDDA and the outputs of wires A through C. In the embodiment of FIG. 9, the resistors R1, R2, and R3 have values of 2 KΩ.

A first differential pair 914 includes transistors Q1 and Q2 wherein the gate of transistor Q1 is coupled to CLKIN and the gate of transistor Q2 is coupled to CLKINZ. The drain of transistor Q1 is coupled to resistor R1, which is also coupled to the output wire B. The drain of transistor Q2 is coupled to resistor R3, which is also coupled to the output wire C. The sources of transistors Q1 and Q2 are coupled a current source $I_{REF1}$ to draw a normalized current of 0.8 through the differential pair 914.

A second differential pair 920 includes transistors Q3 and Q4 wherein the gate of transistor Q3 is coupled to DIN and the gate of transistor Q4 is coupled to DINZ. The drain of transistor Q3 is coupled to the output wire B and the drain of transistor Q4 is coupled to the output wire A. The sources of transistors Q3 and Q4 are coupled to a current source $I_{REF2}$ to draw a normalized current of combined current of 1.2 through the differential pair 920.

A third differential pair 922 includes transistors Q5 and Q6 wherein the gate of transistor Q5 is coupled to CLKIN and the gate of transistor Q6 is coupled to CLKINZ. The drain of transistor Q5 is coupled to the output wire A and the drain of transistor Q6 is coupled to the output wire C. The sources of transistors Q5 and Q6 are coupled to a current source $I_{REF3}$ to draw a normalized current of 0.8 through the differential pair 922.

The transmitter 900 includes an offset current source $I_{RFE4}$ that draws a normalized current of 0.2. The transmitter 900 re-distributes the signal amplitudes of the voltages on the wires A, B, and C to improve the noise margins. The differential pairs 914, 920, and 922 provide for addition of the clock and data signals to generate the voltages for transmission on the wires A, B, and C.

Figure 10:
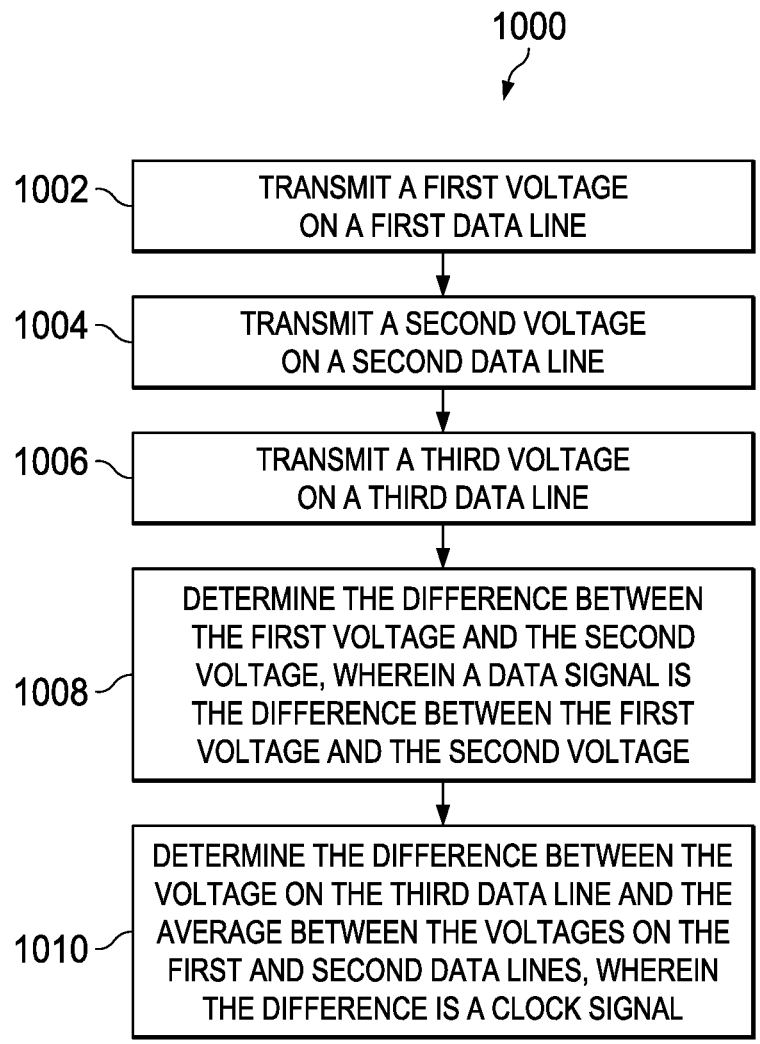
FIG. 10 is a flowchart describing a method of transmitting data on a three wire system.

FIG. 10 is a flowchart 1000 describing a method of transmitting data on a three wire system. Step 1002 includes transmitting a first voltage on a first data line, step 1004 includes transmitting a second voltage on a second data line, and step 1006 includes transmitting a third voltage on a third data line. Step 1008 includes determining the difference between the first voltage and the second voltage, wherein a data signal is the difference between the first voltage and the second voltage. Step 1010 includes determining the difference between the voltage on the third data line and the average between the voltages on the first and second data lines, wherein the difference is a clock signal.

While some examples of digital receivers and methods for transmitting data have been described in detail herein, it is to be understood that the inventive concepts may be otherwise variously embodied and employed and that the appended claims are intended to be construed to include such variations except insofar as limited by the prior art.

What is claimed is:

1. A receiver for decoding data, the data having three states of −1, 0, and +1, the receiver comprising:
   a first input coupled to a first data line;
   a second input coupled to a second data line;
   a third input coupled to a third data line;
   a first comparator coupled to a first output, wherein the first comparator is for generating data signals in response to a sign of voltages on the first data line minus voltages on the second data line; and
   a second comparator coupled to a second output, wherein the second comparator is for generating clock signals in response to a sign of voltages on the third data line minus an average of voltages on the first and second data lines.

2. The receiver of claim 1, wherein the first comparator has a non-inverting input coupled to the first input and an inverting input coupled to the second input.

3. The receiver of claim 1, wherein the first comparator outputs a logic 1 in response to the voltage on the first data line being greater than the voltage on the second data line, and wherein the first comparator outputs a logic 0 in response to the voltage on the first data line being less than the voltage on the second data line.

4. The receiver of claim 1, wherein the second comparator is for generating a logic 1 in response to the voltage on the third data line being greater than the average of the voltages on the first data line and the second data line.

5. The receiver of claim 1, wherein the voltages transmitted on the data lines are digital signals having values of logic 1 or logic 0 and wherein the digital signals are configured so that the logic levels on the first data line minus the logic levels on the second data line are either a −1 or a +1.

6. The receiver of claim 1, wherein the voltages on the first and second data lines are normalized to −1.0, +1.0, −0.2, and +0.2 volts.

7. The receiver of claim 1, wherein the voltages on the third data line are normalized to −0.8 and +0.8 volts.

8. The receiver of claim 1, wherein the output of the first comparator is coupled to an input of a flip-flop and wherein the output of the second comparator is coupled to a clock input of the flip-flop.

9. The receiver of claim 8, wherein the flip-flop is a double edge triggered flip-flop.

10. A method for transmitting data on a three-wire system, the method comprising:
   transmitting a first voltage on a first data line;
   transmitting a second voltage on a second data line;
   transmitting a third voltage on a third data line;
   determining the difference between the first voltage and the second voltage, wherein a data signal is the difference between the first voltage and the second voltage; and
   determining the difference between the voltage on the third data line and the average between the voltages on the first and second data lines, wherein the difference is a clock signal.

11. The method of claim 10, wherein determining the difference between the first voltage and the second voltage comprises comparing the first voltage to the second voltage, wherein the data signal is a logic 1 in response to the comparison being positive, and wherein the data signal is a logic 0 is the comparison in response to the comparison being negative.

12. The method of claim 10, wherein determining the difference between the first voltage and the second voltage comprises subtracting the second voltage from the first voltage, wherein the data signal is a logic 1 if the result of the subtraction is positive, and wherein the data signal is a logic 0 if the result of the subtraction is negative.

13. The method of claim 10, wherein determining the difference between the voltage on the third data line and the average between the voltages on the first and second data lines comprises:
   determining the average of the first voltage and the second voltage;
   determining the difference between the third voltage and the average of the first voltage and the second voltage.

14. The method of claim 13, wherein the clock signal is a logic 1 in response to the difference between the third voltage and the average of the first voltage and the second voltage being positive, and wherein the clock signal is a logic 0 in response to the difference between the third voltage and the average of the first voltage and the second voltage and the third voltage being negative.

15. The method of claim 13, wherein determining the difference between the third voltage and the average of the first voltage and the second voltage comprises subtracting the average of the first voltage and the second voltage from the third voltage.

16. The method of claim 10, wherein transmitting the first voltage and transmitting the second voltage includes transmitting voltages that are normalized to −1.0, +1.0, −0.2, and +0.2 volts.

17. The method of claim 10, wherein transmitting the third voltage includes transmitting voltages that are normalized to −0.8 and +0.8 volts.

18. The method of claim 10, wherein a data signal is determined upon each transition of the clock signal.

19. A method for transmitting data on a three-wire system, the method comprising:
   transmitting a first voltage on a first data line;
   transmitting a second voltage on a second data line;
   transmitting a third voltage on a third data line;
   subtracting the second voltage from the first voltage, wherein a data signal is a logic 1 is response to the result of the subtraction being positive, and wherein the data signal is a logic 0 in response to the result of the subtraction being negative;
   determining the average of the first voltage and the second voltage; and
   determining the difference between the average of the first voltage and the second voltage and the third voltage, wherein a clock signal is a first logic state in response to the difference being positive and the clock signal is a second logic state in response to the difference being negative.

20. The method of claim 19, wherein transmitting the first voltage and transmitting the second voltage includes transmitting voltages that are normalized to −1.0, +1.0, −0.2, and +0.2 volts, and wherein transmitting the third voltage includes transmitting voltages that are normalized to −0.8 and +0.8 volts.

* * * * *